(12) United States Patent
Nakajima

(10) Patent No.: US 8,112,179 B2
(45) Date of Patent: Feb. 7, 2012

(54) MULTI-JOINT ROBOT AND CONTROL PROGRAM THEREOF

(75) Inventor: Yuichiro Nakajima, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 624 days.

(21) Appl. No.: 12/303,649

(22) PCT Filed: Jun. 25, 2007

(86) PCT No.: PCT/JP2007/062675
§ 371 (c)(1),
(2), (4) Date: Dec. 5, 2008

(87) PCT Pub. No.: WO2008/001713
PCT Pub. Date: Jan. 3, 2008

(65) Prior Publication Data
US 2010/0234999 A1 Sep. 16, 2010

(30) Foreign Application Priority Data
Jun. 26, 2006 (JP) .................................. 2006-175063

(51) Int. Cl.
*G05B 15/00* (2006.01)
*G05B 19/00* (2006.01)
(52) U.S. Cl. ...................................................... 700/261
(58) Field of Classification Search .......... 700/249–250, 700/253, 256, 258, 260–263; 318/568.16–568.18, 318/568.2, 568.21; 901/2, 14–47, 50
See application file for complete search history.

(56) References Cited

U.S. PATENT DOCUMENTS
4,807,153 A * 2/1989 Onaga et al. .................. 700/256
(Continued)

FOREIGN PATENT DOCUMENTS
JP 63-241614 10/1988
(Continued)

*Primary Examiner* — Khoi Tran
*Assistant Examiner* — Harry Oh
(74) *Attorney, Agent, or Firm* — Finnegan, Henderson, Farabow, Garrett & Dunner, LLP

(57) ABSTRACT

The present invention provides a multi-joint robot that, when the loads acting on some of joints are overloaded, controls the joints so as to continue the work as far as possible while easing the overloaded state. The load estimate unit (32) estimates the load acting on each joint, and the overloaded joint specifying unit (34) specifies an overloaded joint of which the estimated load is greater than a threshold. The storage unit (40) stores a target state vector of an end link of the robot and stores a predetermined priority with respect to the components of the vector. The component extracting unit (42) extracts the same number of components as that of non-overloaded joints from the target state vector in order of a higher priority. The force control calculating unit (36) determines the target drive quantity for driving the overloaded joint in the same direction as that of the load. The inverse transformation unit determines the target drive quantities with respect to the non-overloaded joints so as to realize the extracted components. Thus, the non-overloaded joints can be controlled so as to follow the target state vector as far as possible, while the overloaded joints are controlled in a direction to reduce the load.

5 Claims, 4 Drawing Sheets

U.S. PATENT DOCUMENTS

| | | | |
|---|---|---|---|
| 4,864,206 A * | 9/1989 | Onaga et al. | 318/568.11 |
| 6,127,792 A * | 10/2000 | Kamiya et al. | 318/432 |
| 6,222,338 B1 * | 4/2001 | Villaret | 318/568.13 |
| 7,023,164 B2 * | 4/2006 | Iribe et al. | 318/563 |
| 7,099,747 B2 * | 8/2006 | Mikami et al. | 700/245 |
| 7,881,824 B2 * | 2/2011 | Nagasaka et al. | 700/260 |

FOREIGN PATENT DOCUMENTS

| | | |
|---|---|---|
| JP | 3-178788 | 8/1991 |
| JP | 2003-82701 | 3/2003 |
| JP | 2005-144644 | 6/2005 |
| JP | 2005-161469 | 6/2005 |

* cited by examiner

MULTI-JOINT ROBOT AND CONTROL PROGRAM THEREOF

CROSS REFERENCE TO RELATED APPLICATION

The present application is a national phase application of International Application No. PCT/JP2007/062675, filed Jun. 25, 2007, and claims priority to Japanese Patent Application No. 2006-175063, filed on Jun. 26, 2006, the contents of both of which are hereby incorporated into this specification by reference.

FIELD OF THE INVENTION

The present invention relates to a multi joint robot and a control program for the multi-joint robot (computer program product for controlling the multi-joint robot).

BACKGROUND ART

The multi-joint robot has a multi-joint robot mechanism and a controller for controlling the mechanism. In this specification, a "multi joint robot mechanism" may be referred to as a "multi joint robot" or simply "robot". The multi joint robot mechanism in this specification refers to a robot that comprises plural links and plural joints, wherein adjoining links are connected by a joint and at least two or more joints are disposed between a base link and an end link. The end link herein referred to is not necessarily limited to a link that is physically disposed at a distal end of the robot. The end link here refers to a link to which a target state vector is given. In a case with a multi joint robot provided with an arm including five fingers, for example, if a target vector of a palm link is given, the palm link corresponds to the herein referred "end link", even though finger links are connected to the further distal end of the palm link. This specification defines that one degree of freedom is counted as one joint. For example, "joint" capable of rotating adjoining links about two axes is made of two joints.

The multi-joint robot having N joints (i.e. the multi-joint robot having N degrees of freedom) can make a current state vector of the end link follow a target state vector that is described in dimensions not higher than N by controlling each of the joints independently. In this specification, the expression "make a current state vector of the end link follow a target state vector" may be simplified into an expression "make the end link follow the target state vector". The target state vector may be given in the unit of position (or attitude), or in the unit of velocity (or angular velocity). Or it may be given in the unit of acceleration (or angular acceleration), or in the unit of force (or torque). When the target state vector has six dimensions and it is given in the unit of position (attitude), the components of the target state vector are given by the six scalar values of the positions along with each of the coordinate axes in the orthogonal coordinate system; i.e. of the so-called roll angle, pitch angle, and yaw angle. Since the components of the target state vector may be expressed various unit systems, this specification uses, instead of using the expressions such as "target position vector", "target velocity vector" and so forth, the term of "target state vector" without specifying a particular unit system. It should be noted that the "current state vector" of the end link is a vector in which the physical state of the end link is described in the same unit system as the target state vector.

Here, the dimensions of the target state vector has been described as being "not higher than N", the reason of which lies in that the multi-joint robot in this specification may have the so-called redundant degree of freedom.

When the target state vector of not higher than N dimensions is given to the end link of the multi-joint robot having N degrees of freedom, the target drive quantity of each joint for moving the end link to follow the target state vector can be determined. The unit of the target drive quantity of each joint may be expressed in various unit systems, such as position (or angle), velocity (or angular velocity) and so forth. The expression "target drive quantity" in this specification is used in the meaning including "the target state" of a joint, such as a target joint angle and a target angular velocity of a joint. Therefore, in the present application, the expression "to drive a joint so as to make the current joint angle of the joint follow the target joint angle" may be expressed as "to make a joint follow the target drive quantity".

It is well known that the target drive quantity of each joint for making the end link follow the target state vector can be derived from the so-called inverse transformation or the Jacobian matrix. When the target drive quantity of each joint is acquired, an actuator for driving the joint is controlled in such a manner that the current state (e.g. current joint angle, current joint angular velocity) of the joint follows the target drive quantity (e.g. target joint angle, target joint angular velocity) of the joint. Here, "driving the joint" means varying the relative position (attitude) between the links connected with the joint. In the case of a rotary joint, "driving the joint" means varying the angle (joint angle) between the links connected with the joint. In the case of a slide joint, it means varying the distance between the links connected with the joint.

Making the end link of the robot follow the target state vector will make the robot perform a predetermined work. For instance, by attaching an end effector such as a gripper or a welding tool to the end link of the robot and making the end link follow the target state vector varying with time, it is possible to move the end effector along a desired trajectory and perform a predetermine work. Alternately, in the case where the multi joint robot is a legged robot, it is possible to make the robot perform a working motion by making a foot link corresponding to the end link follow the target state vector.

While the robot is performing a work, loads acting on joints may increase. For example, when the robot continues the control of following the target state vector varying with time despite the robot having come into contact with an unexpected object, the robot may consequently push the object aside. While the robot is pushing the object aside, the loads acting on the joints may increase. Moreover, in a case where the robot performs a work of lifting an object by a gripper attached to the end link, if the weight of the lifted object is unexpectedly heavy, the loads acting on the joints may also increase unexpectedly. Among the loads acting on the joint, the load component acting on the drive axis of the joint can be reduced by providing an overload countermeasure such as a torque limiter to the actuator that drives the joint. The load acting on the drive axis of the joint is hereinafter taken as the object. Further, "overload" in the present application refers to a state in which the load acting on a joint exceeds a predetermined threshold. In other words, the "overload" in the present application is not limited to the case in which a load exceeding a physically permissible limit of a joint acts on the joint.

The torque limiter mounted on the joint as the overload countermeasure has two types: a mechanical torque limiter and a software-based torque limiter. The Japanese Patent Application Publication No. 2005-161469 discloses one example of the software-based torque limiter. The Japanese Patent Application Publication No. 2005-161469 discloses a technique that monitors a current applied to a motor of an actuator, and stops the supply of current to the motor when the applied current exceeds a predetermined level.

DISCLOSURE OF THE INVENTION

When a joint becomes overloaded and the torque limiter is activated, the joint may not be controlled based on the target drive quantity.

As mentioned above, in the multi-joint robot, the target drive quantity of each joint is determined so as to make the end link follow the target state vector. The value of each component of the target state vector is usually the function of the target drive quantities of plural joints. Moreover, the target drive quantity of individual joint is determined on the premise that all the joints of the robot can be used for making the end link follow the target state vector. Therefore, if any one of the joints becomes overloaded and that joint becomes incapable of following its target drive quantity, it becomes impossible for some of the components of the current state vector of the end link follow the corresponding components of the target state vector. In other words, the robot would have no choice other than interrupting the work.

The fact that one joint becomes overloaded may not mean that the other joints are also overloaded. There is a high possibility that the number of joints not being overloaded is larger than the number of joints being overloaded. If there remain any joints not being overloaded, it is preferable to appropriately drive these joints, thereby continue the control for making the end link of the robot follow the target state vector as far as possible, and make the robot continue the predetermined work.

In the conventional technique, if any one of the joints becomes overloaded, attention is paid only to dissolving the overloaded state; it has not been focused on intending to continue the predetermined work as far as it is feasible while dissolving the overloaded state. It is preferable that, even if some of the joints are overloaded, the multi-joint robot may try to continue the predetermined work by using the other joints that have not been overloaded while dissolving the overloaded state.

In order to make the current state vector of the end link of the robot follow a given target state vector, it is required that the number of joints that can be controlled to an arbitrary joint angle is equal or greater than the number of components of the target state vector. In other words, the robot is required to have equal or greater than N degrees of freedom with regard to the target state vector of N dimensions. Normally, the number of degrees of freedom that the robot should have is determined depending on the number of dimensions of the target state vector. If the target state vector has N dimensions, for example, a multi-joint robot having N degrees of freedom will be provided. When one of the joints is overloaded while the robot performs a work, that joint cannot be used any more for the control of making the end link follow the target state vector. Accordingly, the number of joints that can be used for the control of making the end link follow the target state vector falls below N. As the result, it becomes impossible to make the end link of the robot follow the target state vector.

The inventor focused on the fact that the target state vector of the end link includes some components that should make the end link follow as correctly as possible, and the other components that does not have to have the end link follow with much accuracy, depending on the types of work that the robot should perform. For example, assume a work that the robot holds and moves a glass filled with water by an end effector attached to the end link. Here, the target state vector is assumed to have six components of spatial six dimensions of the end link (target positions in the directions of three axes of the orthogonal coordinate system, and target attitude angles around the three axes). The target attitude angle of the end link is set so as not to spill out the water in the glass. In this case, if either of the attitude angles around the two axes on the horizontal plane of the end link (i.e. tilt angles of the glass) deviates from the target attitude angle, the water in the glass may spill out. On the other hand, even if the attitude angle around the vertical axis of the end link (that is, the rotation angle about the vertical axis of the glass) deviates from the target attitude angle, the water is unlikely to spill out. Moreover, even if the attitude angle around the vertical axis varies, the positions in the three axial directions of the glass will not vary. In the work to move the glass without spilling the water, if the attitude angle around the vertical axis of the end link does not follow the target attitude angle and the other components of the current state vector (that is, the five components of the positions in the three axial directions and the attitude angles around the two axes on the horizontal plane of the end link) follow the corresponding components of the target state vector, the work to move the glass can be performed perfectly. In other words, when the actuator of one of the joints is overloaded (that is, when the joint cannot be used for the control of making the end link pursue the target state vector), although a follow-up performance of the current attitude angle about the vertical axis of the end link for following the target attitude angle may well be sacrificed, it may be possible to continue the work if the remaining joints are controlled in a manner that respective follow-up performance of other components of the current state vector for pursuing their corresponding component of the target state vector is maintained.

The present invention sets priority to individual components of the target state vector of the end link of the robot. Of the components of the target state vector, a higher priority is given to the component to be followed as accurately as possible, and a lower priority is given to the component for which a high follow-up performance is not required. The priority can be set in advance according to the types of work for the robot to perform. Then, the following processes are executed while the robot performs a work. Joints in an overloaded state are specified, and the target drive quantity of each of the overloaded joint is determined so as to solve the overloaded state, regardless of the target state vector.

For example, when target joint angles for the joints are set as the target drive quantities, the target joint angle of the overloaded joint may be determined so as to rotate the joint in the same direction as the direction of the load being acted.

On the other hand, the number of non-overloaded joints not being overloaded is specified, and the components are extracted from the target state vector, in order of a higher priority, as many as the number of non-overloaded joints. Since the number of the extracted components is equal to the number of the non-overloaded joints, it is possible to determine the target joint angles of the non-overloaded joints for realizing the extracted components.

The present invention is based on a novel concept that reduces the number of dimensions of the target state vector to the number of joints that can be used for the control of making the end link follow the target state vector; contrary to the conventional concept that the number of degrees of freedom of the multi-joint robot must be equal to or over the number of dimensions of the target state vector. Further, the invention focuses on the fact a priority order exists in the components of the target state vector with regard to the follow-up performance, and sets the priority in advance for each of the components of the target state vector. The invention reduces the dimension of the target state vector by excluding the components in the target state vector in the order of low priority, thereby maintaining the follow-up performance of the components (components of the target state vector) that are important for the work. On the other hand, with regard to the overloaded joints, the target drive quantities of the overloaded joints are set so as to solve the overloaded state regardless of the target state vector.

The present teachings described above provide a multi-joint robot capable of continuing an initially planned work as far as it is feasible while easing the overloaded state of an overloaded joint.

Note that the above discussion is not dependent on the unit system of each component of the target state vector. The units of individual components of the target state vector may be the position and angle (attitude angle), as well as be the velocity and acceleration. In the same manner, the units of the target drive quantity of a joint may be the angle, as well as be the angular velocity, angular acceleration, and torque. Alternately, in the case with a slide joint, the target drive quantity of the joint may be the extension length, extension velocity, extension acceleration, or extension force.

The teachings of the present invention can be realized in a multi joint robot having a multi-joint robot mechanism and a controller. The multi-joint robot mechanism includes plural links, plural joints, and plural actuators. Adjacent links are connected by a joint, and each of the actuators drives respective joint, whereby the robot is made capable of varying the state of the end link.

The controller includes a storage unit, a load estimate unit, an overloaded joint specifying unit, a first drive quantity calculating unit, a second drive quantity calculating unit, and a driver.

The storage unit stores a target state vector of the end link and a priority set to each of the components of the target state vector. The load estimate unit estimates magnitude and direction of a load acting on the drive axis of each joint. The overloaded joint specifying unit specifies overloaded joint of which the estimated magnitude of the load acting thereupon is greater than a threshold and non-overloaded joint of which the estimated magnitude of the load acting thereupon is not greater than the threshold. The first drive quantity calculating unit calculates target drive quantity for driving the overloaded joint in the same direction as the estimated direction of the load acting on the overloaded joint. Meanwhile, the second drive quantity calculating unit extracts the same number of components as that of the non-overloaded joints from the components of the target state vector in the order of high priority, and calculates target drive quantity for driving each of the non-overloaded joints so as to realize the values of the extracted components. The driver controls the actuators based on the target drive quantities that the first drive quantity calculating unit and the second drive quantity calculating unit calculate.

The load acting on the drive axis of each joint is, for example, a torque acting on the drive axis in the case with a rotary joint, and is a force acting in the extension direction along the drive axis in the case with a slide joint.

The load estimate unit may be an operating unit that receives, in the case with the rotary joint, a signal from a torque sensor mounted on a joint axis, and multiplies the received signal by a predetermined coefficient to estimate the magnitude and direction of the load. Alternately, in a case where the actuator is a current-driven motor, the load estimate unit may be an estimator that estimates the magnitude and direction of an output torque of the actuator based on a current command that the driver outputs to the motor, and estimates the magnitude and direction of the load acting on the drive axis based on the output torque. In many cases, the current-driven motor substantially has a proportional relation between the applied current and the output torque. As for such a motor, by multiplying the current command that the driver outputs to the motor by a torque coefficient, the output torque of the motor can be estimated. Multiplying the output torque of the motor by a torque transmission constant from the motor axis to the joint drive axis makes it possible to estimate the output torque of the joint.

The magnitude of the output torque of the joint may be regarded as the estimated magnitude of the load. The direction opposite to the direction of the output torque may be regarded as the estimated direction of the load. Alternately, the magnitude and direction of the load acting on the drive axis of each joint may be estimated on the basis of the magnitude and direction of an external force that are detected by a force sensor which may be attached to the end link. The transformation from the external force detected by the force sensor into the loads acting on the drive axes of joints can be calculated by using the well known Jacobian matrix.

As mentioned above, the target drive quantity of the joint may be any one of the joint angle, joint angular velocity, joint angular acceleration, and torque in the case of the rotary joint. In the case of a slide joint, it may be any one of the extension length, extension velocity, extension acceleration, and extension force. The target state vector may vary over time. The threshold may be a value different for each joint, and also may vary over time.

The overloaded joint specifying unit specifies a joint of which the estimated magnitude of the load is greater than a threshold as an overloaded joint, and a joint of which the estimated magnitude of the load is not greater than the threshold as a non-overloaded joint. Here, the classification of "greater than the threshold" and "not greater than the threshold" may be modified into the classification "not less than the threshold" and "less than the threshold". It should be noted that this modification will not be beyond the technical scope of the present invention. It is essential to provide the threshold in the present invention. On the other hand, classification of the joint on which the load of the same magnitude as the threshold acts as the non-overloaded joint is merely for convenience sake for classifying the joint above or below the threshold without mathematical contradiction. Even if the joint on which the load of the same magnitude as the threshold acts is classified into the overloaded joint, such modification will not contradict the feature of the present invention.

In the above configuration, the overloaded joint specifying unit classifies all the joints into overloaded joint on which a load exceeding the threshold acts and non-overloaded joint otherwise. With regard to the overloaded joint, the first drive quantity calculating unit determines the target drive quantity that drives the overloaded joint in the same direction as the load regardless of the target state vector. This is because driving the overloaded joint in the same direction as the direction to which the load acts will ease the load acting on the overloaded joint. On the other hand, with regard to the non-overloaded joint not being overloaded (i.e. a joint usable for the follow-up control to the target state vector), the second drive quantity calculating unit determines the target drive quantity that drives the non-overloaded joint so as to make the end link follow the target state vector within the workable range. Specifically, the second drive quantity calculating unit extracts the same number of components as the number of non-overloaded joints from the target state vector. Since the number of the non-overloaded joints is equal to the number of the extracted components, the target drive quantities that can realize the values of the extracted components may be determined. Further, the components of the target state vector are extracted in the order of having higher priority that has been set in advance. Therefore, in a case where any of the joints turns to the overloaded state, the component regarded as important in terms of the follow-up performance is always extracted, and the follow-up performance to the target values are secured with regard to the extracted components. Thus, the movement closely resembling that of a planned work can be realized.

In a case where the target drive quantity is expressed by the joint angle, the target drive quantity of each joint can be determined by the inverse transformation (inverse kinematics). Alternately, it can also be determined by a repeated calculation of the forward transform. Furthermore, in a case where the target drive quantity is expressed by the joint angular velocity, it can be determined on the basis of the so-called resolved motion rate control method.

In making the robot to perform a work, an end effector is often attached to the end link of the robot. The end effector such as a gripper (including multi-finger hand), a cutting tool, and a welding tool may be selected depending on the purpose of the work. In such a case, since the end effector comes into contact with an object (e.g. a glass in the above mentioned work of moving a glass), an external force will act on the robot though the end effector. Such external force is an expected force. On the other hand, in the multi-joint robot, the total attitude of the robot is changed when each of the joints are actuated. In consequence, the robot may unexpectedly come into contact with other objects at places other than the end effector. It is preferable to reduce the external force generated by such unexpected contacts. Accordingly, the load estimate unit preferably subtracts the load caused from the external force of which the force sensor detects from the total load of each joint acting upon the drive axis, and thereby estimates the magnitude and direction of the load on the joint. The force sensor may be attached e.g. between the end link and the end effector. The external force acting on the robot through the end effector can be detected by such a force sensor. The load acting on each of the joints can be estimated by the Jacobian matrix, from the external force that the force sensor detects, as mentioned above. On the other hand, the total load that acts on the drive axis of a joint can be estimated by multiplying a current command to the motor of the actuator by a torque constant, as mentioned above.

With regard to the overloaded joint of which the magnitude of the load (the load in which a load caused from the external force detected by the force sensor is subtracted from the total load acting on the drive axis of the joint) exceeds the threshold, the first drive quantity calculating unit calculates the target drive quantity that drives the overloaded joint in the same direction as the direction to which the load acts. To drive the overloaded joint according to the target drive quantity will make the robot change its attitude toward the direction of dissolving the contact state. At the same time, as the target drive quantities of the non-overloaded joints, the second drive quantity calculating unit calculates the drive quantities for making the end link follow the target state vector as correctly as possible. Control of the non-overloaded joints according to the target drive quantities thus calculated will secure the follow-up performance, with regard to the components of a higher priority among the components in the target state vector. Thus, in a case where the robot comes into contact with an object at places other than the end link, the multi joint robot may behave so as to make the end link follow the target state vector as far as such pursuit is feasible, while dissolving the contact state.

The processes executed in the load estimate unit, the overloaded joint specifying unit, the first drive quantity calculating unit, the second drive quantity calculating unit, and the driver, those are included in the controller can be described in a computer program implemented in the controller. Therefore, the present teachings may be embodied in a computer program product for controlling the multi joint robot. The computer program product includes the instructions for a multi-joint robot to perform the following steps:

a load estimate step of estimating magnitude and direction of the load acting on the drive axis of each joint;

an overloaded joint specifying step of specifying overloaded joints of which the magnitude of the load is greater than a threshold and a non-overloaded joints of which the magnitude of the load is not greater than the threshold;

a first drive quantity calculating step of calculating target drive quantities of the overloaded joints that drive the overloaded joints in the same direction as the estimated direction to which the load acts;

a second drive quantity calculating step of extracting the same number of components as that of the non-overloaded joints from the components of a given target state vector of an end link in a given order of a higher priority, and calculating the target drive quantities of the non-overloaded joints that drive the non-overloaded joints so as to realize the values of the extracted components; and an output step of outputting the target drive quantities calculated by the first drive quantity calculating step and the second drive quantity calculating step to a driver that controls actuators.

According to the present teaching, a multi-joint robot which, in a case where any of the joints becomes overloaded, makes the end link of the robot follow the target state vector as accurately as possible, while easing the overloaded state can be realized. According to this multi-joint robot, in a case where any of joints become overloaded, the follow-up performance of the end link to the target state vector is secured in the predetermined order of having higher priority among the components of the target state vector. Therefore, even if any of the joints becomes overloaded, the follow-up performance of the end link (follow-up performance to the components of the target vector, of the components of the current state vector of the end link) may be achieved as for the components of the target state vector that are important, for the work that the multi-joint robot performs. As the result, the multi-joint robot may continue the work as far as possible, even though any of the joints become overloaded.

DESCRIPTION OF THE SYMBOLS

Figure 1:
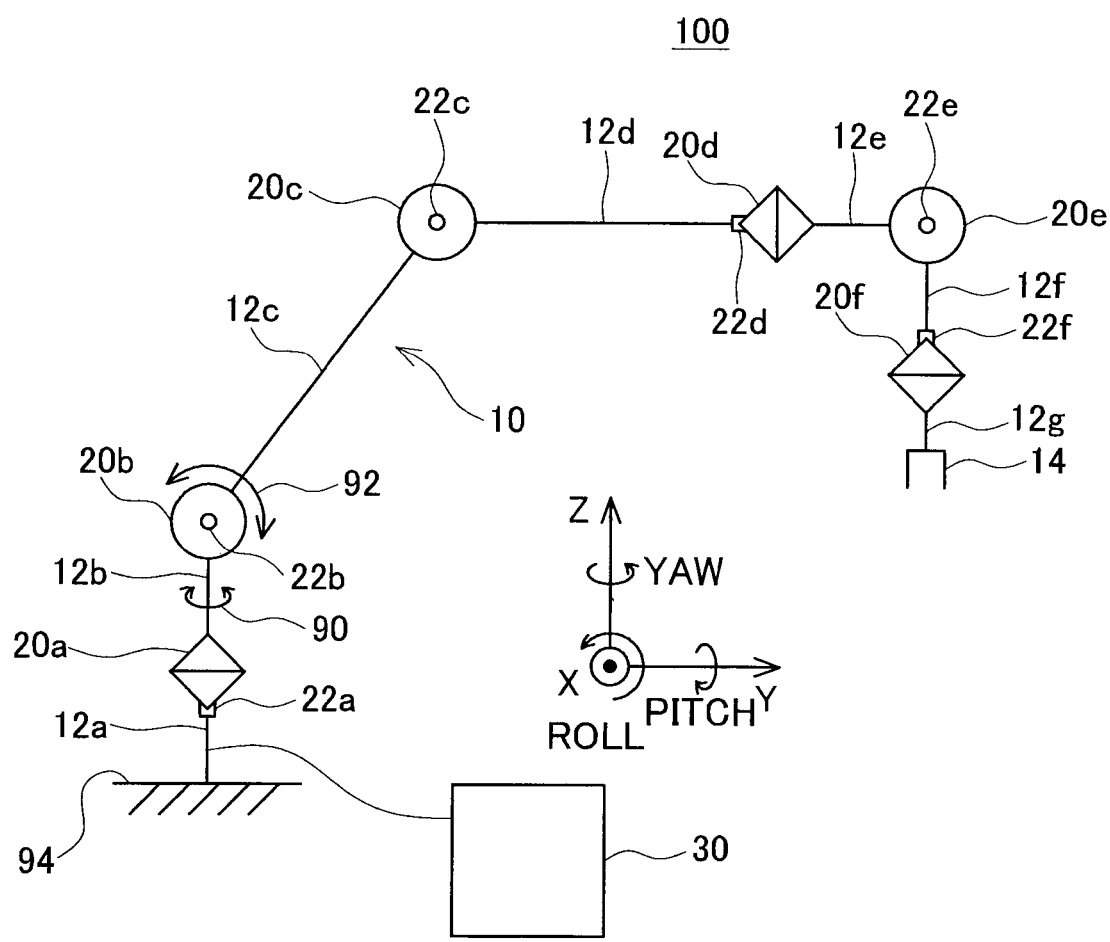
FIG. 1 shows a schematic view of a multi joint robot of the first embodiment.

10: robot mechanism
12a, 12b, 12c, 12d, 12e, 12f, 12g: link
14: end effector 20a, 20b, 20c, 20d, 20e, 20f: joint
22a, 22b, 22c, 22d, 22e, 22f: actuator
26: encoder
28: force sensor
30: controller
32: load estimate unit
34: overloaded joint specifying unit
36: force control calculating unit
38: motor driver
40: storage unit
42: component extracting unit
44: inverse transformation unit

EMBODIMENTS OF THE INVENTION

First Embodiment

The multi joint robot of the first embodiment will be described with reference to the drawings. FIG. 1 shows a schematic view of a multi joint robot 100. The multi joint robot 100 includes a robot mechanism 10 (multi-joint robot mechanism) and a controller 30. FIG. 1 illustrates the robot mechanism 10 with a skeleton diagram showing the coupling structure of the joints and links. The multi-joint robot 100 in this embodiment holds a glass filled with water (not illustrated) located at an initial position with a gripper 14, and performs a glass moving work to place the glass at an intended position with an intended attitude. The multi-joint robot 100 in this embodiment is able to continue, under a circumstance in which the magnitude of a load torque acting on a joint exceeds a preset threshold during the glass moving work, the glass moving work to as much extent of feasibility by using the remaining joints, while controlling to reduce the load with regard to the joint of which the load torque had exceeded the threshold. A case in which the magnitude of a load torque acting on a joint exceeds a threshold may occur, for example, in a circumstance in which a certain part of the robot mechanism 10 comes into contact with the other object and an unexpected external force acts on the robot mechanism 10.

The robot mechanism 10 has seven links: a first link 12a through a seventh link 12g, and six joints: first joint 20a through sixth joint 20f. One end of the first link 12a is fixed to a floor 94. In other words, the first link 12a is immobilized with respect to the absolute coordinate system. The first link 12a immobilized to the absolute coordinate system may be referred to as the base link. The first link 12a and the second link 12b are rotatably connected by the first joint 20a. The second link 12b and the third link 12c are rotatably connected by the second joint 20b. So are the third link 12c, the forth link 12d, the fifth link 12e, the sixth link 12f, and the seventh link 12g. The joint illustrated in a rectangle in FIG. 1, as the first joint 20a, represents the joint whose rotation axis extends along the longitudinal direction of the link. At the first joint 20a, the second link 12b can rotate in the direction of the arrow 90 in FIG. 1 relative to the first link 12a. The joint illustrated in a circle as the second joint 20b represents the joint, the rotation axis of which extends in the vertical direction to the plane of the drawing. At the second joint 20b, the third link 12c can rotate in the direction of the arrow 92 in FIG. 1 relative to the second link 12b.

A motor 22a is attached to the first joint 20a. The relative angle between the first link 12a and the second link 12b may be varied by driving the motor 22a. In other words, the motor 22a is able to drive the first joint 20a. In the same manner, motor 22b through motor 22f are attached to the second joint 20b through the sixth joint 20f, respectively. When all the links are generically referred to hereinafter, they are indicated as "the link 12" with the alphabetical suffixes omitted; likewise, when all the joints are generically referred, they are indicated as "the joint 20", and when all the motors are generically referred, they are indicated as "the motor 22".

The seventh link 12g is referred to as the end link of the robot mechanism 10. An end effector 14 is attached to the seventh link 12g. The end effector 14 is a gripper, whereby the robot can hold an object such as a glass.

The robot mechanism 10 is a 6 degrees-of-freedom robot having six joints from the first joint 20a through the sixth joint 20f. Therefore, the multi joint robot 100 can arbitrarily control the seventh link 12g (namely, the end effector 14) being the end link in the three-dimensional space, with regard to the six degrees of freedom of the positions in the directions of the orthogonal three axes (i.e. x coordinate value, y coordinate value, and z coordinate value in the coordinate system illustrated in FIG. 1), and the rotary angles about the three axes (i.e. roll angle, pitch angle, and yaw angle in the coordinate system illustrated in FIG. 1). In other words, the multi-joint robot 100 is a 6 degrees-of-freedom articulated robot.

An encoder (not illustrated) is mounted on each of the joint 20. The joint angle of respective joints can be detected by the encoder.

The controller 30 receives a signal detected by the encoder (not illustrated). The controller 30 outputs a control signal (current command value) to each of the motors 22. As the controller 30 controls the motors 22, each joint is driven, and the end effector 14 can be positioned at an intended position with an intended attitude. In other words, the glass the end effector 14 grips can be positioned at an intended position with an intended attitude.

Figure 2:
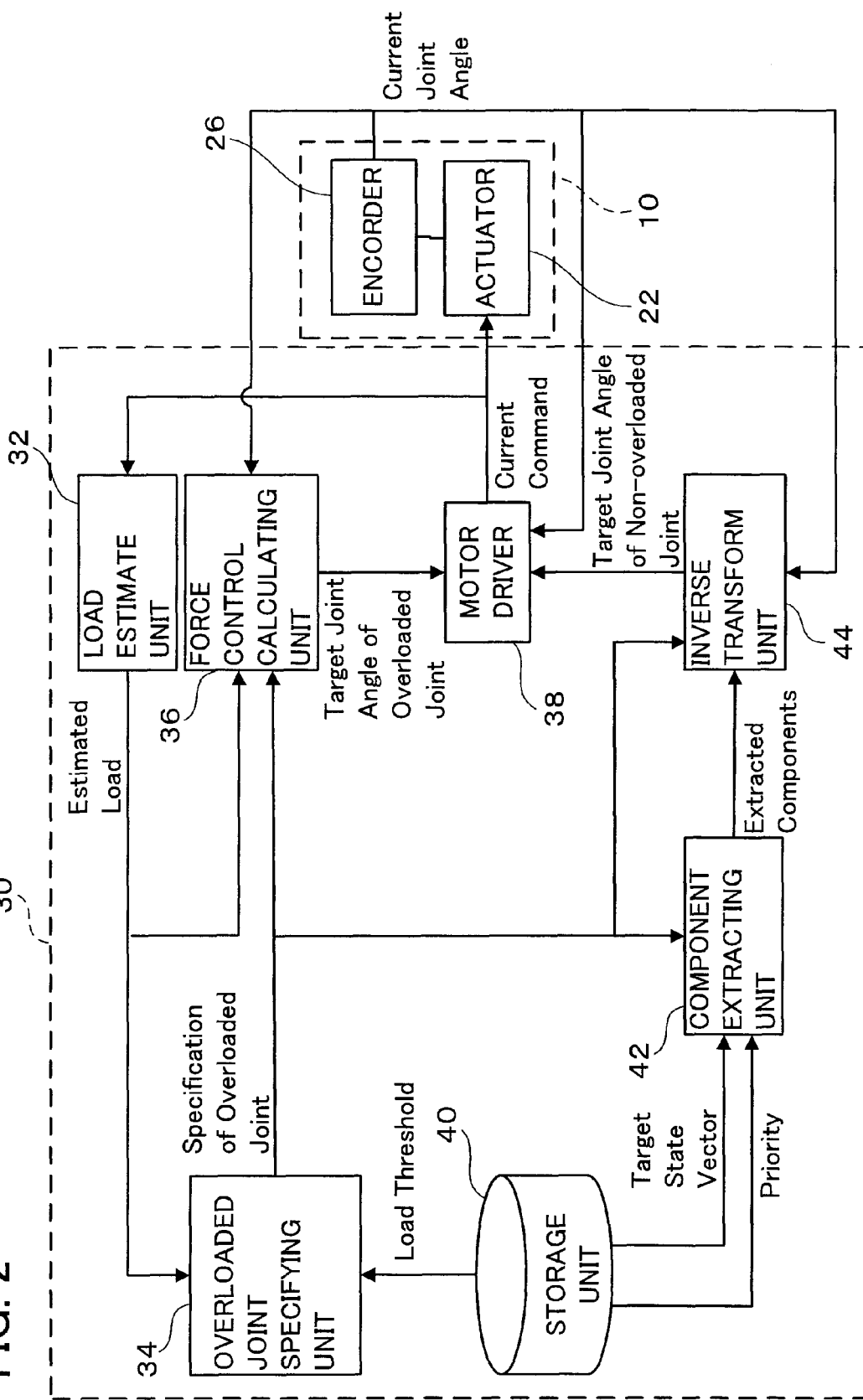
FIG. 2 shows a block diagram of the multi-joint robot of the first embodiment.

FIG. 2 shows a block diagram of the multi joint robot 100. The controller 30 includes a load estimate unit 32, overloaded joint specifying unit 34, force control calculating unit 36, motor driver 38, storage unit 40, component extracting unit 42, and inverse transform unit 44. Each of the units except the storage unit 40 is packaged in the controller 30 as a program module that the CPU (not illustrated) of the controller 30 executes. The robot mechanism 10 includes an actuator 22 and an encoder 26. The actuator 22 and the encoder 26 are installed in each joint. The encoder 26 detects a joint angle (current joint angle) of each joint. In FIG. 2, the end effector 14 is not indicated.

The storage unit 40 stores the target state vector of the seventh link 12g (end link), the priority orders, and the load threshold data of each joint. The target state vector in this embodiment has components regarding the relative position and relative attitude of the coordinate system fixed to the seventh link 12g with respect to the absolute coordinate system. Here, the relative position of the coordinate system fixed to the seventh link 12g with respect to the absolute coordinate system is referred to as the target position; and the relative attitude of the same is referred to as the target attitude angle. In the XYZ coordinate system of the orthogonal three axes illustrated in FIG. 1, the target state vector has totally six values of the target position (i.e. x coordinate value, y coordinate value, and z coordinate value) in the directions of the coordinate axes, and the target attitude angle (i.e. roll angle, pitch angle, and yaw angle) about the coordinate axes, as its components. The target state vector is stored as a time series data whose values are varied over time. In this specification, the value of each component of the target state vector may be referred to as "target component", or simply "target value". The vector having, as its components, the x coordinate value, y coordinate value, z coordinate value, roll angle, pitch angle, and yaw angle (of the coordinate system fixed to the seventh link 12g with respect to the absolute coordinate system), which are calculated from the detected values by the encoder 26, are referred to as a whole the "current state vector" of the end link. Moreover, the values of individual components of the current state vector are sometimes referred to as the current values.

As mentioned above, since the robot mechanism 10 has six joints, the controller 30 can appropriately control the joint angles of the six joints, and thereby make the values of individual components of the current state vector (i.e. current values) of the end link follow the corresponding values of individual components as set forth in the target state vector. The robot is capable of performing the glass moving work that moves a glass filled with water along the target state vector. Here, the current state vector can be calculated from the values of individual joint angles that the encoder 26 detects, by the so-called forward transform.

The priority order stored in the storage unit 40 is set in advance to the six components of the target state vector. The priority here is the specified order of the components to prioritize the accuracy of the follow-up function thereof, under a circumstance in which the values of all the components of the current state vector are unable to follow the values of the corresponding components of the target state vector during a control to make the current state vector of the end link follow the target state vector is being performed by the controller 30. In this embodiment, since the work is to move a glass filled with water, important point for the work is not to spill the water in the glass. Therefore, in this embodiment, the priority is set in the order of: roll angle, pitch angle, z coordinate value, x coordinate value, y coordinate, and yaw angle in the coordinate system illustrated in FIG. 1. Here, the roll angle and pitch angle are given higher priorities; because if these angles deviate from the target values, the glass inclines from the horizontal axis, then the water in the glass may spill out. In the contrary, the yaw angle is given the lowest priority; because even if the glass rotates around the Z axis (namely, vertical axis), the water in the glass is unlikely to spill out, and, moreover, even if the yaw angle varies, the x coordinate value, y coordinate, and z coordinate value of the glass (end link) will not vary. With regard to the positions in the three axes directions, the z coordinate value is given a higher priority than the x coordinate value and the y coordinate in order to avoid that the vertical position of the glass deviate from the target value even if the horizontal position of the glass deviates, since the work in this embodiment is a series of works involving movements of "lifting the glass from the initial position", "moving it", and "bringing it down". By setting the priority as described above, even in a case where the current value of the yaw angle being the lowest priority becomes incapable of following the target value during the glass moving work, the robot 100 can continue the glass moving work when the other current values follow the target values. And even if the current value of the y coordinate value being the next lowest priority to the yaw angle becomes incapable of following the target value, the robot still may move the glass to the target position with regard to at least the x coordinate value and the y coordinate value without spilling out the water when the current values other than the yaw angle and the y coordinate value follow the target values. Thus, if some joints are overloaded and they become unusable for the follow-up control to the target state vector, the robot 100 is capable of trying to continue the planned work as far as it can be worked.

Here, a case in which "the values of all the components of the current state vector are impossible of following the values of the corresponding components of the target state vector" refers to a state in which "the magnitude of the load acting on a joint exceeds the threshold, the joint is controlled to ease the load, and thereby the joint becomes impossible of being used for the follow-up control to the target state vector", which will be detailed later. Such situation arises because it becomes impossible to independently control each of the six components of the current state vector of the end link, when the number of joints usable for the follow-up control to the target state vector becomes less than six.

The storage unit 40 stores the magnitude of the load permissible to each of the joints as the threshold for each of the joints. The threshold is set in advance based on the condition for avoiding the motor to overheat, or based on the condition for avoiding damage to the robot or other object when the robot comes into contact with other object.

The control processes executed by the controller 30 will be described next. First of all, the control in the normal situation (that is, the case where the magnitudes of the loads acting on all the joints are kept below the thresholds) will be described. The target state vector stored in the storage unit 40 is inputted to the inverse transform unit 44 at each predetermined control cycle. The process executed by the component extracting unit 42 will be described later. In addition, the joint angles (current joint angles) measured by the encoders 26 mounted on each joint of the robot mechanism 10 are inputted to the inverse transform unit 44. The inverse transform unit 44 performs the inverse transformation that transforms the target state vector into the target joint angle of each joint (target joint angle vector), by using the current joint angle. The inverse transformation formula can be obtained provided that the link structure of the robot mechanism 10 is already known, and the current joint angle of each joint at each control can be acquired. Since the total number of joints of the multi-joint robot is six and the total number of components of the target state vector is also six in this embodiment, the inverse transformation formula for which to calculate the target joint angles for attaining an arbitrary target state vector can be determined. The six target joint angles acquired by the inverse transform unit 44 are delivered to the motor driver 38. The motor driver 38 controls the actuator 22 in a manner that the current joint angle follows the target joint angle at respective joints. The control mentioned above is the same as the control of the conventional multi joint robot.

Next, the control in a case where the magnitude of the load acting on a joint exceeds the threshold will be described. The magnitude and direction of the load acting on a joint are estimated by the load estimate unit 32. The lowest control loop of the motor driver 38 is the current control loop in this embodiment. The output torque of the motor (the actuator) is substantially proportionate to the current value applied to the motor. Therefore, by monitoring the current command value that the motor driver 38 outputs to the actuator 22, it becomes possible to estimate the magnitude and direction of the output torque of the actuator. The relation between the torque of which the actuator outputs and the torque of which the joint axis outputs can be examined in advance. The load estimate unit 32 estimates the magnitude and direction of the load torque acting on each joint by monitoring the current command value that the motor driver 38 outputs to the actuator.

The magnitude and direction of the estimated load of each joint estimated by the load estimate unit 32 are delivered to the overloaded joint specifying unit 34. The overloaded joint specifying unit 34 reads out the threshold of each joint from the storage unit 40, and compares it to the magnitude of the estimated load by each joint. Here, if the magnitude of the estimated load is greater than the threshold, the joint is specified as the overloaded joint. The joint other than the overloaded joint is specified as the non-overloaded joint. It should be noted that the "overloaded joint" here indicates the joint in which the magnitude of the estimated load exceeds the threshold that had been set in advance; the term is not limited to the joints in which the magnitude of the estimated load exceeds the magnitude of a physical permissible load thereof. All the joints of the robot mechanism 10 are specified as either of the overloaded joint or the non-overloaded joint by the overloaded joint specifying unit 34.

The target joint angle of the overloaded joint is determined by the force control calculating unit 36. The target joint angle of the non-overloaded joint is determined by the inverse transform unit 44.

The force control calculating unit 36 determines the target joint angle for driving the overloaded joint in the same direction as the direction that the load acting to. In this embodiment, the force control logic is expressed by the following formula (1).

$$\tau = K \cdot (\theta d - \theta c) \quad (1)$$

Here, $\tau$ is a magnitude of load estimated by the load estimate unit 32. K is a spring constant, which is set in advance. $\theta c$ is a joint angle (current joint angle) detected by the encoder 26. $\theta d$ is a target joint angle. From the formula (1), the target angle $\theta d$ is determined by the following formula (2).

$$\theta d = \theta c + \tau/K \quad (2)$$

The formula (2) means the following. The target joint angle $\theta d$ is determined at a position where the joint is rotated by $\tau/K$ in the direction to which the load $\tau$ acts, with respect to the detected current joint angle $\theta c$. In other words, the target joint angle $\theta d$ is determined so as to drive the joint in the same direction as an estimated load $\tau$ acts on the joint drive axis. If the magnitude of the load acting on the drive axis of a joint is increased due to a collision of the robot mechanism with the other object, the target joint angle is set which rotates the joint in the same direction as the estimated load $\tau$ acts, and the current joint angle is controlled so as to follow the target joint angle, which reduces the load acting on the joint. With regard to all the joints wherein the magnitudes of the estimated loads exceed the thresholds (namely, the overloaded joints), the variables ($\tau$, K, $\theta d$, and $\theta c$) appearing in the formula (1) and formula (2) may be different values in each of the joints.

The processing result of the overloaded joint specifying unit 34 (namely, information that which joint is the overloaded joint) is delivered to the component extracting unit 42 and the inverse transform unit 44. More specifically, the data indicating the number of the overloaded joint is delivered to the component extracting unit 42. The data indicating the number of the overloaded joint is equivalent to the data indicating the number of the non-overloaded joint. The data specifying the overloaded joint among the joints that the multi joint robot has is delivered to the inverse transform unit 44. Also, the component extracting unit 42 reads out the data of the target state vector and priority from the storage unit 40. The component extracting unit 42 extracts the same number of components as the number of non-overloaded joints in the order of high priority from the components of the target state vector. The component extracting unit 42 delivers extracted target components to the inverse transform unit 44. Since the inverse transform unit 44 receives the data specifying the overloaded joint from the overloaded joint specifying unit 34, the inverse transform unit 44 can specify the non-overloaded joints. Now, in the inverse transform unit 44 are set with plural inverse transformation formulas (inverse transformation group) in advance. The inverse transformation group is a set of the inverse transformation formulas having an arbitrary combination of the components of the target state vector as the input and having an arbitrary combination of the components of the target joint angle vector as the output. The inverse transformation formula group can be acquired in advance from the geometric structure of the robot mechanism. The inverse transform unit 44 selects the inverse transformation formulas among the inverse transformation formula group, which includes the components extracted by the component extracting unit 42 as the input, and the target joint angles of the non-overloaded joints as the output. By using the selected inverse transformations, it becomes possible to acquire the target joint angles of the non-overloaded joints when the components extracted by the component extracting unit 42 are inputted. Thus, through the above process, the target joint angles of the non-overloaded joints are determined by the inverse transform unit 44.

The target joint angles of the overloaded joints are determined by the force control calculating unit 36, and the target joint angles of the non-overloaded joints are determined by the inverse transform unit 44. The target joint angles determined by the above two units are delivered to the motor driver 38. The motor driver 38 controls the actuator 22 in a manner that each of the current joint angles follows each of the determined target joint angles in the same manner as the aforementioned normal situation (i.e. the case in which the overloaded joint does not exist).

The flow of the above processes will be described with reference to a flow chart illustrated in FIG. 3. First, the current joint angle of each joint is acquired by the encoder 26 (Step S100). Next, the controller 30 estimates the magnitude and direction of the load acting on each joint based on monitored current command value delivered from the motor driver 38 to the actuator 22 (Step S102). Next, the magnitude of the estimated load of each joint is compared with the threshold (Step S104). Here, the joint in which the magnitude of the estimated load is greater than the threshold is specified as the overloaded joint. As for the overloaded joint, the target joint angle is determined by the above formula (1) and formula (2) (step S106). Since the overloaded joint is specified at the step S104, the joint other than the overloaded joint is determined as the non-overloaded joint (Step S108). The controller 30 extracts the same number of components as the number of non-overloaded joints in order of a higher priority from the target state vector (Step S110). Then, inverse transform formula having the extracted component as the input, having the target joint angle of the non-overloaded joint as the output is selected (Step S112). The value of the current joint angle acquired at the step S100 is substituted in the inverse transform formula. Thus, the concrete values of the inverse transform formula are set. The extracted values of components are inputted to the set inverse transform formula, and the target joint angles of the non-overloaded joints are determined (Step S114). Both the target joint angles of the overloaded joints determined at Step S106 and the target joint angles of the non-overloaded joints determined at Step S114 are outputted to the motor driver 38 (Step S116). The motor driver 38 controls each joint in a manner that each of the current joint angles follows each of the target joint angles, which is not illustrated in FIG. 3. The above processes are repeated at each control sampling period.

The multi-joint robot 100 in this embodiment has six joints. Thus, the multi joint robot 100 has six degrees of freedom. Therefore, the current state vector of the end link can be controlled so as to follow a six-dimensional current state vector. If all the six joints are non-overloaded joints, all the joints can be used for the follow-up control to the six-dimensional target state vector. In other words, the state vector of the end-point (the end link) can be made to follow the target state vector. However, if the magnitude of the estimated load of a joint exceeds the threshold, the joint will be driven in the direction to which the load acts, regardless of the target state vector, according to the above formula (2). In other words, the overloaded joint is compulsory driven in the direction to which the load is reduced.

Since the overloaded joint is controlled depending on the load regardless of the target state vector, it becomes impossible to use that overloaded joint for the control of making the current state vector of the end link follow the target state vector. The number of the joints (non-overloaded joints) usable for the follow-up control to the target state vector becomes lower than the order of the target state vector. Therefore, the conventional technique cannot make the current state vector of the end link follow the predetermined target state vector. In contrast, in the multi-joint robot 100 in this embodiment, a priority is set in advance with respect to each of the components of the target state vector. Furthermore, the same number of components as the number of the non-overloaded joints is extracted from the components of the target state vector in the order of having higher priority. In other words, the number of dimensions of the target state vector is lowered to the number of joints usable for the follow-up control. Thereby, the target joint angle can be determined which makes the current state vector of the end link follow the target state vector with the number of dimensions thereof lowered. In order for lowering the number of dimensions of the target state vector, it is required to preferentially extract the components in which the follow-up is to be performed more accurately according to the work that makes the multi joint robot execute on the basis of priority. Even if some of the joints become overloaded and to make the current state vector of the end link completely follow the target state vector becomes difficult, the multi-joint robot 100 in this embodiment is able to control the non-overloaded joints so as to maintain a high follow-up performance with regard to the important components of the target state vector. Thereby, the multi-joint robot 100 can be realized to be capable of continuing the work with the utmost follow-up resemblance and duration as possible even if some of the joints become overloaded. Even if some of the joints become overloaded, the multi joint robot 100 in this embodiment always secures the follow-up performance to the component having a higher priority of the components of the target state vector. According to the multi joint robot 100 in this embodiment, even if some of the joints become overloaded, a planned work can be continued as far as possible.

In this embodiment, the target join angle corresponds to one example of the target drive quantity. The load estimate unit 32 in FIG. 2 corresponds to one example of the load estimate unit in the claims. The overloaded joint specifying unit 34 corresponds to one example of the overloaded joint specifying unit in the claims. The force control calculating unit 36 corresponds to one example of the first drive quantity calculating unit in the claims. The component extracting unit 42 and the inverse transform unit 44 corresponds to one example of the second drive quantity calculating unit in the claims.

In this embodiment, the load estimate unit 32, overloaded joint specifying unit 34, force control calculating unit 36, component extracting unit 42, and inverse transform unit 44 are implemented as the computer program modules that the CPU of the controller 30 executes. The load estimate unit 32 and so forth may be implementable with a dedicated hardware that individually performs dedicated processes. In other words, the program that the CPU executes includes the instructions of executing each step of the flow chart illustrated in FIG. 3.

Second Embodiment

Figure 4:
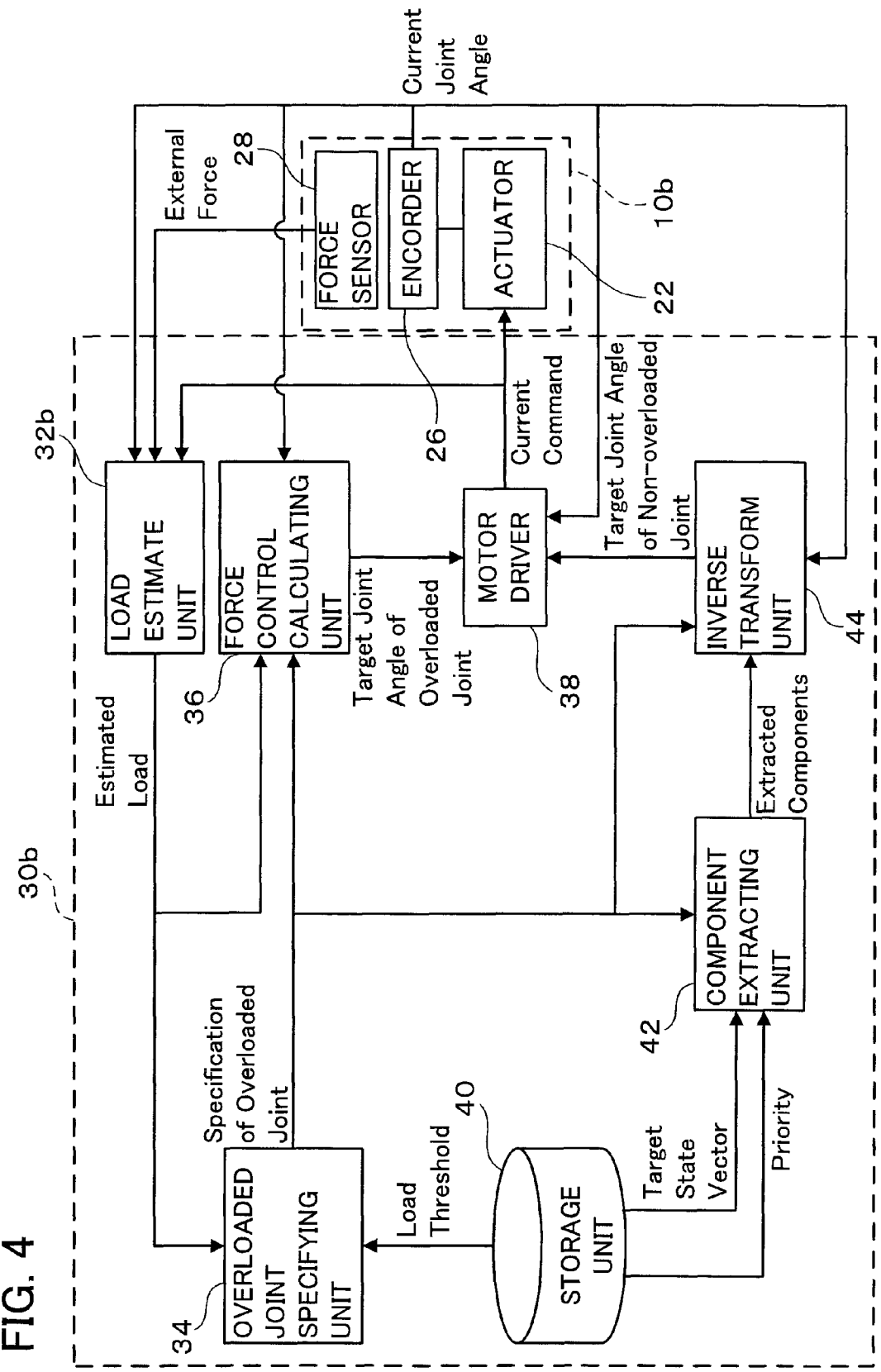
FIG. 4 shows a block diagram of a multi joint robot in the second embodiment.

The second embodiment will be described hereinafter. FIG. 4 shows the block diagram of a multi-joint robot relating to the second embodiment. FIG. 4 applies the same reference numerals to the same components as those in the block diagram in the first embodiment illustrated in FIG. 2. The descriptions of the components with the same reference numerals applied to FIG. 2 will be omitted.

The robot mechanism 10b of the multi joint robot relating to the second embodiment has a force sensor 28 on the end link (the seventh link 12g in FIG. 1). The components other than the force sensor 28 are the same as those of the robot mechanism 10 in the first embodiment, and the descriptions thereof will be omitted. The force sensor 28 is installed between the end effector 14 (refer to FIG. 1) and the end link of the robot mechanism 10b. The force sensor 28 detects the external force acting on the robot mechanism 10b through the end effector 14.

The controller 30b in the second embodiment and the controller 30 (refer to FIG. 2) in the first embodiment (refer to FIG. 2) are different with respect to the load estimate unit 32b. The components other than the load estimate unit 32b are the same as those of the controller 30 in the first embodiment, and the descriptions thereof will be omitted.

The multi-joint robot in this embodiment, in the same manner as the first embodiment, estimates the total load acting on the drive axis of each joint based on the current command value outputted from the motor driver 38 to the actuator 22. The detection value by the force sensor 28 and the detection value by the encoder 26 (current joint angle of each joint) are inputted to the load estimate unit 32b. The load estimate unit 32b transforms the external force detected by the force sensor 28 (i.e. the external force acting on the robot mechanism 10b through the end effector 14) into the load torque acting on the drive axis of each joint (the load torque caused by the external force acting on the end effector). The load estimate unit 32b outputs the subtracted value in which the value of the load torque caused by the external force on the end effector is subtracted from the value of the estimated total load, as the final estimated load. The output here includes the magnitude and direction of the estimated load. Here, the transform of the external force acting on the robot mechanism through the end effector 14 into the load torque to the drive axis of each joint can be acquired by using the transposed matrix of the Jacobian matrix, which is calculated from the current joint angle. Thus, the load estimate unit 32b in this embodiment estimates the magnitude and direction of a load in which the load caused by the external force (the external force acting on the robot mechanism 10b through the end effector 14) detected by the force sensor is excluded from the total load acting on the drive axis of each joint. The load in which the load caused by the external force detected by the force sensor is excluded from the total load acting on the drive axis of each joint is hereinafter referred to as an unexpected load. The external force that causes the unexpected load is referred to as an unexpected external force. The unexpected external force acts, for example, when a change in the attitude by the multi joint robot during the work leads to a collision with other object at a body part other than the end effector. When the magnitude of an unexpected load due to an unexpected external force thereby exceeds the threshold, there is a high possibility of such an unexpected contact by the robot mechanism with the other object happening. In such a case, the robot should preferably be performed so as to dissolve the contact with the other object. The controller 30b in this embodiment is the same as the controller 30 in the first embodiment except the load estimate unit 32b. With regard to the overloaded joint in which the magnitude of a load estimated by the load estimate unit 32b (an unexpected load) is greater than the threshold, the controller 30b drives (rotates) the joint in the same direction as the direction toward which the load acts upon. Thereby, the joint moves in the direction of dissolving the contact of the robot with the other object. Here, the value of the threshold in this embodiment may be different from the value of the threshold in the first embodiment. For example, since the load estimate unit 32b in this embodiment estimates an unexpected load due to an unexpected external force, the threshold may be set to a value that allows the unexpected load.

In the multi joint robot in this embodiment, when the robot comes into contact with the other object at a region other than the end effector, the joints being not involved in the dissolution of the contact (i.e. the non-overloaded joints) are controlled so as to make the current state vector of the end link follow the target state vector as far as it can be thereby compensated, while the contact being solved. In other words, when coming into contact with the other object at a region other than the end effector, the multi joint robot in this embodiment is able to continue the work that the robot is now performing as much as possible, while dissolving the contact.

Third Embodiment

Now the third embodiment will be described. The first embodiment and the second embodiment have used the inverse transform formula for determining the target joint angle of the non-overloaded joint. In the third embodiment, the target value (target drive quantity) for controlling each joint is the joint angular velocity, and the target state vector is expressed by the target velocity of the end link (velocity in the direction of each of the x, y, and z axes in the coordinate system in FIG. 1, roll angular velocity, pitch angular velocity, and yaw angular velocity). When an overloaded joint does not exist, the multi-joint robot in the third embodiment is controlled by the so-called resolved motion rate control. This embodiment applies the resolved motion rate control to determining the target value (angular velocity) of the non-overloaded joint. This embodiment refers to FIG. 2 as to the block diagram of the multi-joint robot. However, the inverse transform unit 44 in FIG. 2 is replaced by a resolved motion rate calculating unit.

The transform from the target state vector of the end link into the target joint angular velocity vector (target drive quantity vector of the joints) is obtained by using the Jacobian matrix. Provided that the target state vector is given by dX, the joint angle vector having the current joint angles of joints as the components is given by T, the target joint angular velocity vector having the target angle velocities of joints as the components (target drive quantity vector) is given by dT, and the Jacobian matrix is given by J(T), the relation between those can be expressed by the following formula (3).

$$dX = J(T) \cdot dT \quad (3)$$

Therefore, the target joint angular velocity vector dT can be expressed by the following formula (4).

$$dT = J^{-1}(T) \cdot dX \quad (4)$$

Here, $J^{-1}(T)$ is the inverse matrix of the Jacobian matrix J(T). In the same manner as the first embodiment, the multi-joint robot has six joints, and the target state vector is a six-dimensional vector having the velocities in the directions of x-axis, y-axis, and z-axis of the end link, the roll angular velocity, the pitch angular velocity, and the yaw angular velocity about each of the three axes as the components. In the formula (3), both dX and dT are six dimensional, and the Jacobian matrix J(T) is the square matrix of 6 by 6. Therefore, as long as the determinant of the Jacobian matrix J(T) is not zero, there exists the inverse matrix $J^{-1}(T)$, and the target joint angular velocity vector dT can be obtained from the target state vector dX, by the formula (4). The so-called resolved motion rate control method is a method which calculates the target joint angular velocities by applying the inverse matrix of the Jacobian matrix to the target state vector wherein each of the components has the unit of (angular) velocity, and controls the actuator of each joint so as to realize the acquired target joint angular velocities.

The processes in this embodiment when there is an overloaded joint will be described. Now, it is provided that the joint of the $i^{-th}$ component of the six-dimensional joint angle vector T is specified as an overloaded joint by the overloaded joint specifying unit 34 in FIG. 2. There is one overloaded joint, and therefore, the component extracting unit 42 extracts five components from those of the six-dimensional target state vector dX in order of a higher priority. In other words, the component extracting unit 42 extracts the target state vector, the dimension of which is lowered to five dimensions. Here, it is provided that the $j^{-th}$ component of those of the six-dimensional target state vector dX is in the lowest order of priority. The resolved motion rate control calculating unit in this embodiment determines the five-dimensional target joint angular velocity vector lacking the $i^{-th}$ component (expressed by dT') based on the five-dimensional target state vector lacking the $j^{-th}$ component (expressed by dX'). Provided that the lower-dimensional Jacobian matrix of 5 by 5 wherein the $j^{-th}$ row and the $i^{-th}$ column are excluded from the Jacobian matrix J(T) of 6 by 6 is given by J'(T), it is understood that the following formula (5) is approved.

$$dX' = J'(T) \cdot dT' \quad (5)$$

Therefore, the five-dimensional target joint angular velocity vector dT' can be obtained by the following formula (6).

$$dT' = J'^{-1}(T) \cdot dX' \quad (6)$$

The resolved motion rate calculating unit in this embodiment can determine the target joint angular velocity vector dT' of the non-overloaded joints (joints other than the $i^{-th}$ joint) by the formula (6). Each of the components of the determined target joint angular velocity vector dT' (the target joint angular velocity vector of each of the non-overloaded joints) is outputted to the motor driver 38. The motor driver 38 controls the actuator 22 so as to follow the target joint angular velocity. The force control calculating unit 36 in this embodiment calculates the target joint angular velocity of the overloaded joint, on the basis of the control rule of the impedance control or the force control by each drive axis.

Here in the above example, the overloaded joint is assumed to be one; however, the same discussion holds good even if there are plural overloaded joints.

The third embodiment calculates the target joint angular velocities (target drive quantities) for the non-overloaded joints, by using the resolved motion rate control method. The resolved motion rate control method determines the target joint angular velocity of each joint from the target state vector composed of the components having the unit of velocity, by using the inverse matrix of the Jacobian matrix. The third embodiment sets the Jacobian matrix of the multi joint robot and specifies a lower-dimensional Jacobian matrix, wherein the column corresponding to the specified overloaded joint (the $i^{-th}$ column in the above example) and the row corresponding to the component of the target state vector that is not extracted (the $j^{-th}$ row in the above example) are excluded. From the components of the target state vector extracted by using the inverse matrix of the lower-dimensional Jacobian matrix, the target joint angular velocities for the non-overloaded joints (target drive quantities) are determined. The third embodiment specifies the number of joints (non-overloaded joints) that can be used for the follow-up control to the target state vector. And, the number of the components of the target state vector is lowered to be equal to the number of the non-overloaded joints. To make the number of the non-overloaded joints equal to the number of dimensions of the target state vector will always maintain the Jacobian matrix that applies between those in a square matrix. Since the Jacobian matrix is maintained in a square matrix, the inverse matrix of the Jacobian matrix can be obtained (excluding a singular point). Thus, the target drive quantity for making the current state vector of the end link follow the target state vector wherein the dimensional number is lowered can easily be determined by the Jacobian matrix wherein the dimensional number is lowered. The resolved motion rate control calculating unit in this embodiment (to be replaced by the inverse transform unit 44 in FIG. 2 or FIG. 4) and the component extracting unit 42 in FIG. 2 or FIG. 4 correspond to one example of the second drive quantity calculating unit in the claims.

Figure 3:
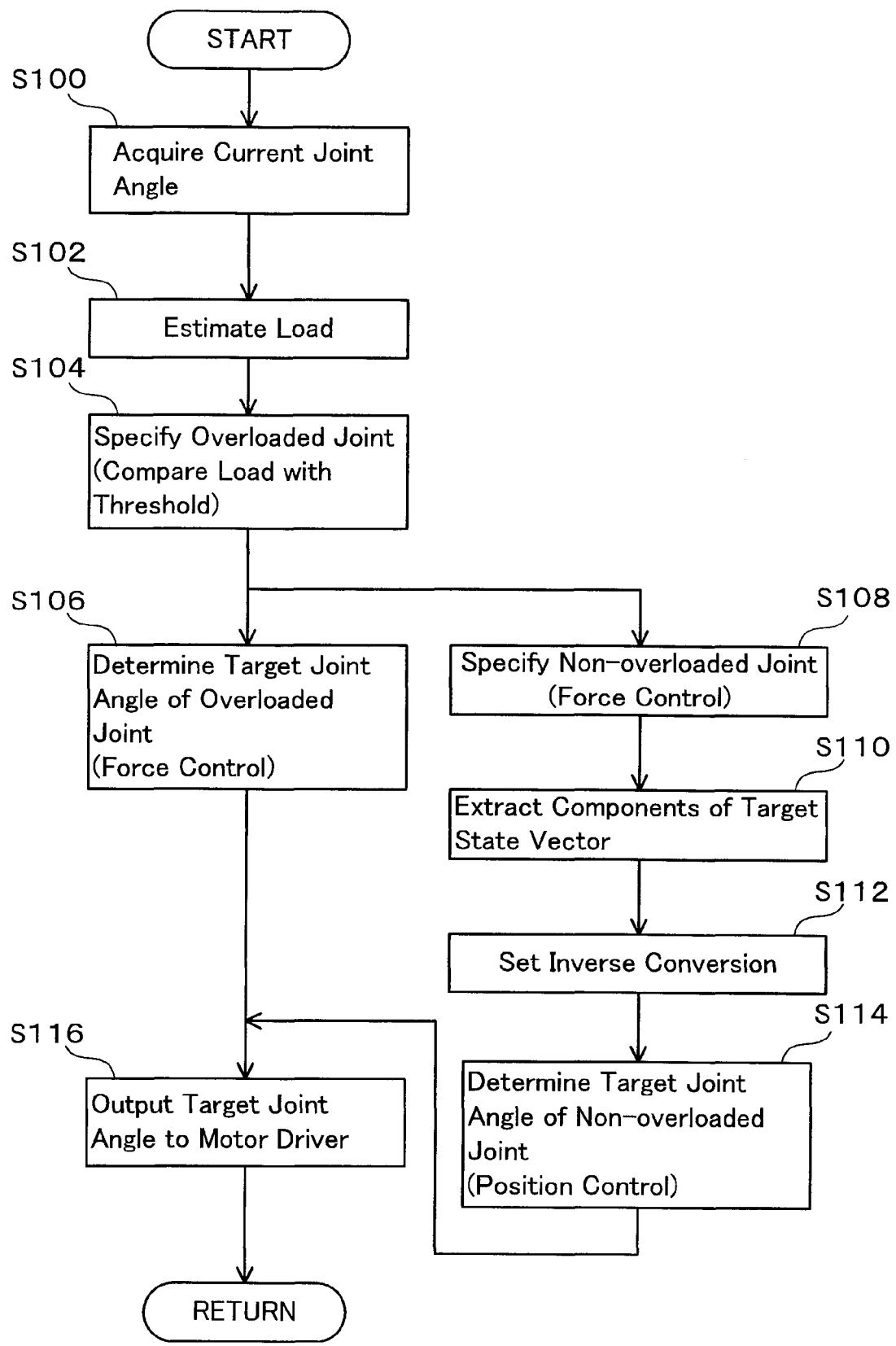
FIG. 3 shows a control flow chart of the multi-joint robot of the first embodiment.

The processes in the flow chart illustrated in FIG. 3 are executed by the controller 30 or the controller 30b. The instructions for the controller 30 or 30b to perform the processes may be described in the computer program. Therefore, the present invention can be embodied in a computer program product for controlling the multi joint robot. Summing up the flow chart illustrated in FIG. 3, the computer program product includes the instructions for the multi joint robot to execute the following steps:

- a load estimate step of estimating magnitude and direction of the load acting on the drive axis of each joint (Step S102);
- an overloaded joint specifying step of specifying an overloaded joint in which the magnitude of the estimated load is greater than a threshold as well as a non-overloaded joint in which the magnitude of the estimated load is not greater than the threshold (Step S104);
- a first drive quantity calculating step of calculating a target drive quantity of the overloaded joint that drives the overloaded joint in the same direction as the direction to which the load acts (Step S106);
- a second drive quantity calculating step of extracting the same number of components as that of the non-overloaded joints from the components of the target state vector of a given end link in the order of having been given higher priority, and calculating the target drive quantities of non-overloaded joints that drive the non-overloaded joints so as to realize the values of the extracted components (Step S110, S112, and S114); and
- an output step of outputting the target drive quantities that the first drive quantity calculating step and the second drive quantity calculating step calculate to a driver that controls actuators (Step S116).

Although the specific examples of the present invention have been thus described, these are only illustrations, and they will not limit the scope of the claims. The technique described in the claims includes various modifications and changes of the examples described above.

For example, a load caused by the dead weight of the robot itself may act on each drive axis. Or, a load caused by the force of inertia may act when some of the links of the robot move at a high speed. The loads caused by the dead weight and/or the force of inertia of the robot are a load that may be estimated; there may be a case that these loads should be excluded from the estimated load being compared with the threshold for specifying an overloaded joint. In such a case, it is suitable that the load estimate unit estimates the magnitude and direction of the load wherein the load caused by the gravity force may be excluded from the total load acting on the drive axis, for each joint. Alternately, it is suitable that the load estimate unit estimates the magnitude and direction of the load wherein the load caused by the force of inertia may be excluded from the total load acting on the drive axis, for each joint. Further, it is suitable that the load estimate unit estimates the magnitude and direction of the load wherein a load caused by both the dead weight and the force of inertia is excluded from the total load acting on the drive axis, for each joint. Here, the magnitude and direction of the load acting on the drive axis due to the dead weight of the robot may be calculated from the mass and moment of inertia of each part of the robot and the current joint angles of the joints. And, the magnitude and direction of the load acting on the drive axis caused by the force of inertia may be calculated from the joint angular accelerations and angular velocities of the joints.

The technical features described in this specification or in the drawings will display a technical usefulness alone or by various combinations, which are not limited to the combinations of the claims on the occasion of application. Further, the techniques illustrated in this specification or in the drawings can attain plural purposes at the same time, and to attain one purpose of those in itself will hold a technical usefulness.

What is claimed is:

1. A multi-joint robot having a multi-joint robot mechanism and a controller, wherein:
   the multi-joint robot mechanism includes plural links, plural joints, and plural actuators, wherein adjacent links are connected by a joint and each of the actuators drives a respective joint, whereby the robot is capable of varying the state of an end link; and
   the controller includes:
   a storage unit that stores a target state vector of the end link and a priority set to each component of the target state vector;
   a load estimate unit that estimates a magnitude and a direction of a load acting on a drive axis of each joint;
   an overloaded joint specifying unit that specifies an overloaded joint of which the estimated magnitude of the load is greater than a threshold and a non-overloaded joint of which the estimated magnitude of the load is not greater than the threshold;
   a first drive quantity calculating unit that calculates a target drive quantity for driving the overloaded joint in the same direction as the direction of the load acting on the overloaded joint;
   a second drive quantity calculating unit that extracts the same number of components as that of the non-overloaded joints from the components of the target state vector in the order of having higher priority, and calculates target drive quantities for driving the non-overloaded joints so as to realize the values of the extracted components; and
   a driver that controls the actuators based on the target drive quantities calculated by the first drive quantity calculating unit and the second drive quantity calculating unit.

2. The multi-joint robot of claim 1, wherein:
   each of the actuators is a motor having a proportional relation between an applied current and an output torque; and the load estimate unit estimates the magnitude and direction of the load based on a current command that the driver outputs to the motor.

3. The multi-joint robot of claim 1, wherein:

a force sensor is attached to the end link; and the load estimate unit estimates the magnitude and direction of the load acting on the drive axis of each joint based on an external force detected by the force sensor.

4. The multi-joint robot of claim 1, wherein:

a force sensor is attached to the end link; and the load estimate unit estimates the magnitude and direction of the load acting on the drive axis of each joint by subtracting a load caused by an external force detected by the force sensor from a total load of each joint acting on the drive axis.

5. A computer program to be performed by a processor for controlling a multi-joint robot that has plural links, plural joints, and plural actuators, wherein adjacent links are connected by a joint and each of the actuators drives respective joint, whereby the robot is capable of varying the state of an end link, the computer program includes instructions for the multi-joint robot to perform following steps:

a load estimate step, performed by the processor, of estimating magnitude and direction of a load acting on a drive axis of each joint;

an overloaded joint specifying step of specifying an overloaded joint of which the estimated magnitude of the load is greater than a threshold and a non-overloaded joint of which the estimated magnitude of the load is not greater than the threshold;

a first drive quantity calculating step of calculating a target drive quantity for driving the overloaded joint in the same direction as the direction of the load acting on the overloaded joint;

a second drive quantity calculating step of extracting the same number of components as that of the non-overloaded joints from the components of a predetermined target state vector of the end link in the order of having predetermined higher priority, and calculating target drive quantities for driving the non-overloaded joints so as to realize the values of the extracted components; and an output step of outputting the target drive quantities calculated by the first drive quantity calculating step and the second drive quantity calculating step to a driver that controls actuators.

* * * * *